Reissued Apr. 30, 1935

Re. 19,549

UNITED STATES PATENT OFFICE 19,549

DECORATED ARTICLE AND METHOD OF PRODUCING THE SAME

Lawrence C. Byck, Elizabeth, and Gilbert L. Peakes, Metuchen, N. J., assignors to Bakelite Corporation, New York, N. Y., a corporation of Delaware No Drawing. Original No. 1,815,234, dated July 21, 1931, Serial No. 572,085, June 30, 1922. Renewed August 3, 1928. Application for reissue July 20, 1933, Serial No. 681,326

19 Claims. (Cl. 18—61)

This invention relates to improvements in methods of producing decorated articles, and has for its object to provide a method by means of which articles of this character may be economically manufactured and in which the decorative matter is incapable of being injured or marred.

The method relates to the production of articles of this character from substances which are capable of being hardened and rendered substantially insoluble and infusible.

More particularly, the method relates to the production of articles of this character from phenolic condensation products, by which is meant those synthetic products which, in their initial state, are known as potentially reactive resins; that is, those reactive products of phenols and formaldehyde or their equivalents capable of being hardened and rendered substantially insoluble and infusible upon being subjected to heat, or to heat and pressure.

In its broad aspect the method consists in providing a base or layer of the substance, either in a hardened or semi-hardened state, having the decorative matter thereon, covering the decorative matter by a layer of the substance in a fluid or semi-fluid state, and then subjecting the mass to heat, or to heat and pressure, by means of which the layers will be firmly bonded together to form a unitary solid block having the decorative matter firmly embedded therein. The block may then be shaped in any suitable manner to form an article of any desired character, such as a pendant, watch charm, paper weight, umbrella handle, smoker's pipe, napkin ring, vanity box, cigar holder, etc.

The decorative matter may be in the form of an ornamental design, an emblem, a monogram, a photograph or any other desired design, it may be applied to the hardened or semi-hardened base or layer in any suitable manner, and it may be colored or embellished as desired. The decorative matter should be of such character that it is resistant to heat and to the chemical action of the substance in which it is to be embedded or of the constituents thereof. It should also be comparatively thin, and must be capable of bonding with the substance and must not induce cracking of the finished product due to differences in expansion or to moisture.

Preferably the decorative matter is in the form of some type of photographic transfer, as, for example, autotype carbon tissue or the like, or it may be a decalcomania. Carbon tissue is desirable as it is well adapted for producing reproductions of a decorative nature from a photographic negative thereof in any well-known manner, whereby a number of articles may be produced having the same decorative matter embedded therein.

One preferred method embodying the invention will now be described, but it is to be understood that the invention is not to be limited thereto, as various modifications to the same may be made within the scope of the invention.

A base layer of a condensation product, such as "bakelite," for example, is provided which may be of any desired shape, size or color, and which may be in a hardened state, or it may be in a semi-hardened state, in which case it is substantially insoluble and infusible but may be softened by heating to a moderate temperature. The surface of the base which is to receive the decorative matter is rendered substantially smooth in any suitable manner, as by sandpapering or polishing the same. We have found that the decorative matter will adhere to the smooth surface of the base, without "sizing" or other adhesive, contrary to the usual practice when carbon transfers and the like are applied to substances such as porcelain, ivory, or the like. The applying of the decorative matter to the surface of the base without an adhesive is a desirable feature.

The carbon transfer is applied to the smooth surface of the base in such a manner that the design will be placed in the desired position thereon. The design is then developed in place upon the base layer, in the usual manner. When the developed design is dry it will be in perfect contact with the smooth surface of the base and will adhere thereto sufficiently to withstand ordinary handling.

The decorative design may be left plain, or it may be gilded, colored, or embellished in any desired manner. It is possible to produce many novel effects by combining various colors of base material with suitable colors of design.

The base layer having the decorative matter applied thereto, either plain or embellished as above set forth, is, when dry, placed within a suitable mould or receptatcle and a layer of the substance in fluid or semi-fluid form is then applied thereto in such a manner as to cover the decorative matter to the desired depth. In order to do this, the condensation product in its initial state of a potentially reactive resin, and of the desired color and transparency, is melted until it is sufficiently fluid to pour over the decorative matter to completely cover the same.

The whole is then heated with or without counter-pressure, sufficiently to harden the fluid or semi-fluid material, and to further harden the base if same was in a semi-hardened state thereby uniting the whole into a solid block having the design permanently and visibly embedded therein. The block or unit so formed is then made into an article of the desired character in any suitable manner.

It is, of course, understood that the adjacent portions or stratum, of which the block is composed, may be of any desired color or colors, and of any desired degree of transparency. The portions may be of the same, or of different shades or colors, and if desired the base portion or stratum upon which the decorative matter is applied may be opaque or substantially opaque, whereas the covering portion or stratum will, of course, be sufficiently transparent to permit the decorative matter to be seen. Also, the portion or stratum may be of any desired shape, size or thickness, depending upon the character of the article which it is desired to produce.

Furthermore, the respective portions or strata of the block during the process of manufacture may have different shapes and configurations imparted thereto, depending upon the character of the finished article desired. For instance, it may be found of advantage to form the lower portion or stratum which serves as a base to which the decorative matter is applied with a centrally located depression or protuberance to receive the transfer or embellishment after which the covering portion or stratum is superimposed thereupon. We have sometimes found it also to be of advantage to mold the base portion or stratum in such a way as to provide a covering portion or stratum of the transparent material extending outward and beyond the peripheral edge of the base portion or stratum, thus providing a transparent surrounding extension or frame to the embedded design or embellishment.

While we have described certain preferable ways of practicing the principles of our invention, we do not wish to be restricted precisely thereto as changes in the steps of the process or processes may be varied within the confines of the appended claims.

We claim:

1. The herein described method which includes providing a base, applying decorative matter thereto, covering the decorative matter with a transparent substance of sufficient fluidity to permit it to be poured over the decorative matter and capable of being rendered hard when subjected to heat, subjecting the transparent substance to heat, to harden the same, and to secure it to the base to form a block.

2. The herein described method which includes providing a base applying decorative matter thereto, covering the decorative matter with a potentially reactive resin in a fluid state, hardening said covering to secure it to the base to form a block.

3. The herein described method which includes providing a base of an insoluble and infusible substance, applying decorative matter thereto, covering the decorative matter with a transparent substance adapted to be flowed thereover and to be rendered insoluble and infusible, treating the transparent substance to harden the same and to render it insoluble and infusible, and securing the hardened transparent substance to the base to form a block.

4. The herein described method which includes providing a base of condensation product, applying decorative matter thereto, covering the decorative matter with a condensation product of sufficient fluidity to be flowed over the decorative matter, and hardening the covering to secure it to the base to form a block.

5. The herein described method which includes providing a base of phenolic condensation product, applying decorative matter thereto, covering the decorative matter with a phenolic condensation product of sufficient fluidity to be flowed over the decorative matter, hardening the covering and securing it to the base to form a block.

6. The herein described method which includes providing a base of a condensation product, applying decorative matter directly thereto, covering the decorative matter with a potentially reactive resin in a melted condition, hardening the covering and securing it to the base to form a block.

7. The herein described method which consists in applying decorative matter directly to a base, covering the decorative matter with a transparent substance in fluid form, hardening the transparent substance and uniting it to the base, and shaping the united product to form an article of a desired character.

8. The herein described method which consists in applying decorative matter directly to a base, covering the decorative matter with a transparent substance in fluid form, hardening the transparent substance and uniting it to the base by the application of heat or heat and pressure and shaping the united product to form an article of a desired character.

9. An article of manufacture, comprising a plurality of homogeneously united layers of a phenolic condensation product, at least one of which is transparent and a decorative design visible between the layers.

10. Article of manufacture comprising a base, decorative matter applied to the base, and a cast transparent hardened resin of reactive character covering the decorative material and homogeneously united to the base.

11. Article of manufacture comprising a base, decorative matter applied to the base, and a cast transparent hardened phenolic condensation product covering the decorative material and homogeneously united to the base.

12. An article of manufacture comprising a plurality of homogeneous layers of transparent phenolic condensation products and a decorative design upon the surface of one layer and visible through the layers.

13. The herein described method which comprises applying a design to a base formed of a transparent phenolic condensation product, covering the design with a transparent phenolic condensation product and uniting the base and transparent covering.

14. The herein described method which includes providing a base of an insoluble and infusible substance, applying decorative matter thereto, covering the decorative matter with a transparent substance adapted to be flowed thereover and to be rendered insoluble and infusible, treating the transparent substance to harden the same and to render it insoluble and infusible, and securing the hardened transparent substance to the base to form a block, and subsequently forming the block to the desired form by machining.

15. A process of manufacturing blocks of artificial resin in differently colored layers consisting in pouring artificial resin in a liquid condition around hard artificial resin of the desired color, and subsequently hardening the block thus produced.

16. A process of manufacturing blocks of artificial resin in different colored layers, consisting in providing a base of artificial resin of one color and pouring an artificial resin of a different color in a liquid condition around said base, and subsequently hardening the block thus produced.

17. The process of manufacturing decorative blocks of artificial resin in differently colored layers, having embedded decorative matter between said layers which consists in providing a solid base of artificial resin of one color, applying decorative matter to said base, and pouring artificial resin of a different color in a liquid condition around said base and decorative matter, and subsequently hardening the block thus produced.

18. Process of manufacturing a block from artificial resin composition with differently colored portions which comprises pouring artificial resin composition of one color in a fluid condition in contact with a hard artificial resin composition of another color, and subsequently hardening the block thus produced.

19. Process of manufacturing a block from artificial resin composition with differently colored portions which comprises forming a layer of solid artificial resin composition in one color, placing the layer within a mold, applying thereto an artificial resin composition of another color in a fluid condition, and hardening the applied layer to unite the whole into a solid block.

LAWRENCE C. BYCK.
GILBERT L. PEAKES.